United States Patent [19]

Scherer et al.

[11] Patent Number: 4,761,530

[45] Date of Patent: Aug. 2, 1988

[54] ELECTRIC INDUCTION HEAT TREATING FURNACE

[75] Inventors: Ronald W. Scherer, LaPorte, Ind.; Nicholas V. Ross, Youngstown, Ohio

[73] Assignees: National Steel Corporation; Ajax Magnethermic Corporation, both of Del.

[21] Appl. No.: 100,246

[22] Filed: Sep. 23, 1987

Related U.S. Application Data

[63] Continuation-in-part of Ser. No. 33,755, Apr. 3, 1987, abandoned.

[51] Int. Cl.$^4$ .............................................. H05B 6/10
[52] U.S. Cl. ............................ 219/10.71; 219/10.69; 219/10.79; 219/10.75; 219/10.61 R; 428/659; 427/45.1; 118/50.1; 118/620
[58] Field of Search ............... 219/10.67, 10.69, 10.71, 219/10.57, 10.79, 10.77, 10.75, 10.61 R; 428/659; 427/45.1, 46, 372.2, 374.2; 118/50.1, 620, 641, 642, 643

[56] References Cited

U.S. PATENT DOCUMENTS

| | | | |
|---|---|---|---|
| 2,180,038 | 11/1939 | Denneen et al. | 266/129 |
| 2,293,049 | 8/1942 | Denneen et al. | 219/10.75 |
| 2,343,889 | 3/1944 | Denneen et al. | 219/10.79 |
| 2,448,009 | 8/1948 | Baker | 219/10.79 |
| 2,448,012 | 8/1948 | Baker | 219/10.79 |
| 2,481,008 | 9/1949 | Gagliardi et al. | 219/10.79 |
| 2,986,808 | 6/1961 | Schnedler | 428/659 |
| 3,056,694 | 10/1962 | Mehler | 428/659 X |
| 3,190,768 | 6/1965 | Wright | 428/659 X |
| 3,692,969 | 9/1972 | Kasper | 219/10.57 |
| 3,705,285 | 12/1972 | Cachat | 219/10.79 X |
| 4,585,916 | 4/1986 | Rich | 219/10.61 R |

OTHER PUBLICATIONS

Making, Shaping and Treating of Steel, 8th Ed., p. 987.

Primary Examiner—Philip H. Leung
Attorney, Agent, or Firm—O'Neil and Bean

[57] ABSTRACT

An improved electric induction furnace for use in the continuous heat treatment of a running length of coated metal strip moving in a substantially straight path through the furnace includes at least one heating coil extending completely around the path of the strip and extending in closely spaced relation to the opposed surfaces of the strip. The furnace is mounted on a track for movement transversely of the strip path, and each coil is provided with movable connector doors for opening and closing the continuous loops whereby when the coil is not energized, the connector doors may be disengaged to open the coil and permit the furnace to be moved along its track between a retracted non-use position and an online heat treating position. The coils are supported for transverse and angular adjustment to accurately align the coils with the strip whereby the opposed surfaces of the strip are substantially equal distant from the heating coils throughout the path through the furnace.

14 Claims, 6 Drawing Sheets

ELECTRIC INDUCTION HEAT TREATING FURNACE

RELATED APPLICATION

This is a continuation-in-part of copending application Ser. No. 033,755, filed April 3, 1987 now abandoned.

BACKGROUND OF THE INVENTION

1. Field of the Invention

This invention relates to furnaces for heat treating a running length of metal passing therethrough and more particularly to an improved electric induction furnace particularly suited for heat treating a coated metal strip such as zinc coated steel strip following application of the coating, for example in a hot dip galvanizing operation.

2. Description of the Prior Art

In the production of coated steel product in which a steel substrate is coated with an iron zinc alloy, it is known to initially apply the coating as a substantially iron-free zinc coating and to alloy the zinc in the coating with iron from the underlying substrate by heating the coated substrate to a temperature and for a time to permit iron molecules from the steel substrate to migrate through the zinc to produce the desired alloy coating.

Heat necessary to alloy a zinc coating on a continuous ferrous substrate such as steel strip or wire (hereinafter strip) is conventionally applied by passing the zinc coated strip in a running length through a furnace similar to that employed in a continuous annealing operation. Such furnaces normally have an elongated heating chamber through which the running length passes and in which heat is applied in a controlled manner to quickly heat the running length to the desired temperature and to maintain it at this temperature for the desired length of time. Conversion of an essentially pure zinc coating, or a coating containing small amounts of aluminum, to a zinc-iron alloy coating in this manner has become known in the industry as a galvanneal process and the product produced is conventionally referred to as a galvanneal product. The term "galvanneal" will therefore sometimes be used herein to refer generally to this basic process and product.

Examples of prior art apparatus and process employed in the production of galvanneal, and particularly for the production of iron zinc alloy coated steel in continuous strip form can be found in U.S. Pat. Nos. 2,986,808 to Schnedler, 3,056,694 to Mehler et al and 3,190,768 to Wright. Each of these prior art patents discloses the coating of a continuous or running length of steel strip in a conventional hot dip galvanizing operation wherein the strip material receives suitable pretreatment to remove oxides, rolling oils and the like from its surface and is then conducted through a controlled atmosphere into a spelter pot containing a supply of molten zinc. From the spelter pot, the zinc coated strip passes upwardly and immediately into the galvanneal furnace, preferably while the zinc coating is still in the molten state, where heat is applied to increase the temperature of the zinc coating and the underlying steel substrate to a temperature and for a sufficient time to permit alloying of the coating with the iron molecules from the steel substrate. A similar process is described in "Making, Shaping and Treating of Steel", 8th Ed., pg. 987, wherein it is stated that the galvanneal coatings have a silvery matte finish having good paint adherance properties without requiring further surface preparation and are capable of withstanding moderate forming operations. It will be recognized that various factors including strip thickness, coating weight, the speed of travel of the strip through the furnace and the length of the furnace chamber will determine the length of time that the strip is exposed to the heat treatment process.

While galvanneal has been known and commercially used for many years, difficulty has been encountered in the production of a satisfactory product for many uses at a commercially acceptable rate. For example, minor variations in the thickness of the zinc coating applied to a steel strip as well as variations in the steel substrate itself, including surface conditions, strip thickness and the like, can result in non-uniform alloying of the zinc while passing through the galvanneal furnace. In addition, the furnaces conventionally used in the production of galvanneal have not been entirely satisfactory in that they generally have not been capable of uniformly heating the coated steel or maintaining the desired temperature throughout the substantially straight path through the furnace.

Although the use of electric induction heating is suggested by each of the above-mentioned U.S. patents, in commercial practice gas fired furnaces of the general type described in the Mehler et al patent have been used for the continuous production of galvanneal in strip or strand form. Such gas fired furnaces, when employed for the production of galvanneal in a continuous strip coating line, have included banks of gas fired burners positioned on both sides of the strip, with the banks on each side being enclosed in an insulated box-like housing. Such furnaces inherently produce large volumes of high temperature gas which, combined with air drawn by convection into the bottom of the furnace, passed upward with the moving strip in its path through the furnace. As indicated in the Mehler et al patent, the primary concern in such gas fired furnaces is to provide adequate space between the jets and the moving strip so that the jets do not impinge too closely onto the surface of the strip to thereby avoid disturbance of the molten metal coating and to avoid localized hot spots. The size and construction have made it impossible or impractical to accurately control the position of the jets relative to the strip in the known gas fired galvanneal furnaces commercially available.

It is known to mount gas fired galvanneal furnaces for movement along horizontal tracks extending perpendicular to the direction of movement of the strip and parallel to the side surfaces of a strip moving through the furnace. The separate banks of gas jets on each side of the furnace enabled the box-like housing to be constructed with one end open to permit movement along these tracks for removal of the furnace from the strip processing line, as for example, when ordinary hot dip galvanized strip was to be produced on the line.

Other problems inherent in the commercial gas fired galvanneal furnaces are discussed in the above-mentioned Schneider patent which is directed to an electric heating furnace for the production of galvanneal. This prior art patent teaches that either resistance or induction heating may be employed and two versions of an induction heating furnace are described. In one version, two banks of induction coils are disposed one on each side of a strip moving through the furnace much in the same manner as the banks of gas jets in a conventional gas fired galvanneal furnace. In the other version, the induction coils extend completely around the strip. Experimental versions of this heating arrangement only are described, however, and to the best of applicant's knowledge, a commercially acceptable furnace for use in the high speed production of galvanneal strip was not developed for utilizing the inventive concept of this patent.

The arrangement of FIG. 3 of the Schnedler patent wherein a plurality of coils are disposed on each side of the strip would inherently result in a substantially less efficient utilization of the electrical energy. While the arrangement of FIG. 2 would be more efficient, this arrangement results in a furnace construction wherein the strip would necessarily have to be cut in order to move the furnace from the position above the zinc pot, making it necessary to rethread the system if such a furnace were constructed for movement in the manner described above with respect to gas fired furnaces. In this respect, it is noted that all of the prior art patents mentioned above are totally silent as to construction of the furnace and do not suggest any means for control to maximize efficiency of the units or to enable accurate positioning of the induction units relative to the strip passing therethrough.

Summary of the Invention

It is a primary object of the present invention to provide an improved induction furnace for use in the production of zinc iron alloy coated steel strip on a continuous basis.

A further object is to provide such an improved furnace including induction heating coils for applying energy completely around a running length of zinc coated steel strip passing through the furnace.

A further object is to provide such a furnace including means to accurately position the coils relative to a running length of zinc coated steel strip passing therethrough to enable more efficient use of the electric energy while avoiding danger of contact between the running length of coated steel and the coils.

Another object is to provide an improved galvanneal furnace in which, during operation, induction coils completely surround the running length of coated steel being heat treated and which includes means for opening the induction coils when the coils are not energized to enable the furnace to be moved transversely of the strip to a non-use position while the strip remains in position.

In the attainment of the foregoing and other objects and advantages of the invention, an important feature resides in providing at least one induction heating coil consisting of a plurality of loops of electrical conducting material through which a running length of zinc coated steel is passed during heat treatment in the furnace. The coil is designed to extend in closely spaced relation to the opposed side surfaces of a running length of coated steel strip during operation, with the coil extending around the edges of the strip to form the complete loop.

Each coil is provided with movable connector door means at one end. Each movable door means carries segments of the electrical conductor material which may be moved to a closed operating position completing the loop to provide an electrical circuit throughout the coil and to an open position interrupting the electrical circuit and providing an opening in one end of the coil whereby the furnace may be moved laterally to pass the running length of strip through the coil opening to enable the furnace to be removed from the line.

The furnace according to the present invention includes a main frame supported by wheels on a pair of tracks extending in a horizontal direction and generally parallel to the side surfaces of a strip moving in the line, and a second or coil support frame is mounted on the main frame. The induction coils are mounted in the coil support frame to provide a substantially straight path through the open center of the coils. The second frame is mounted for limited movement in a horizontal direction perpendicular to the direction of movement of the main frame to thereby accurately position the coils relative to a strip passing through the furnace, and means is provided for adjusting the vertical alignment of the coil support frame whereby the position of the strip relative to the coils can be maintained constant throughout the length of the furnace to accommodate limited deviations in the strip path such as might be occasioned by use of an anti-flutter roll to deflect the strip for reducing flutter and transverse bowing of the strip during movement to the furnace.

BRIEF DESCRIPTION OF THE DRAWINGS

The foregoing features and advantages of the invention will be apparent from the following detailed description, taken in conjunction with the drawings, in which.

Figures 1, 2:
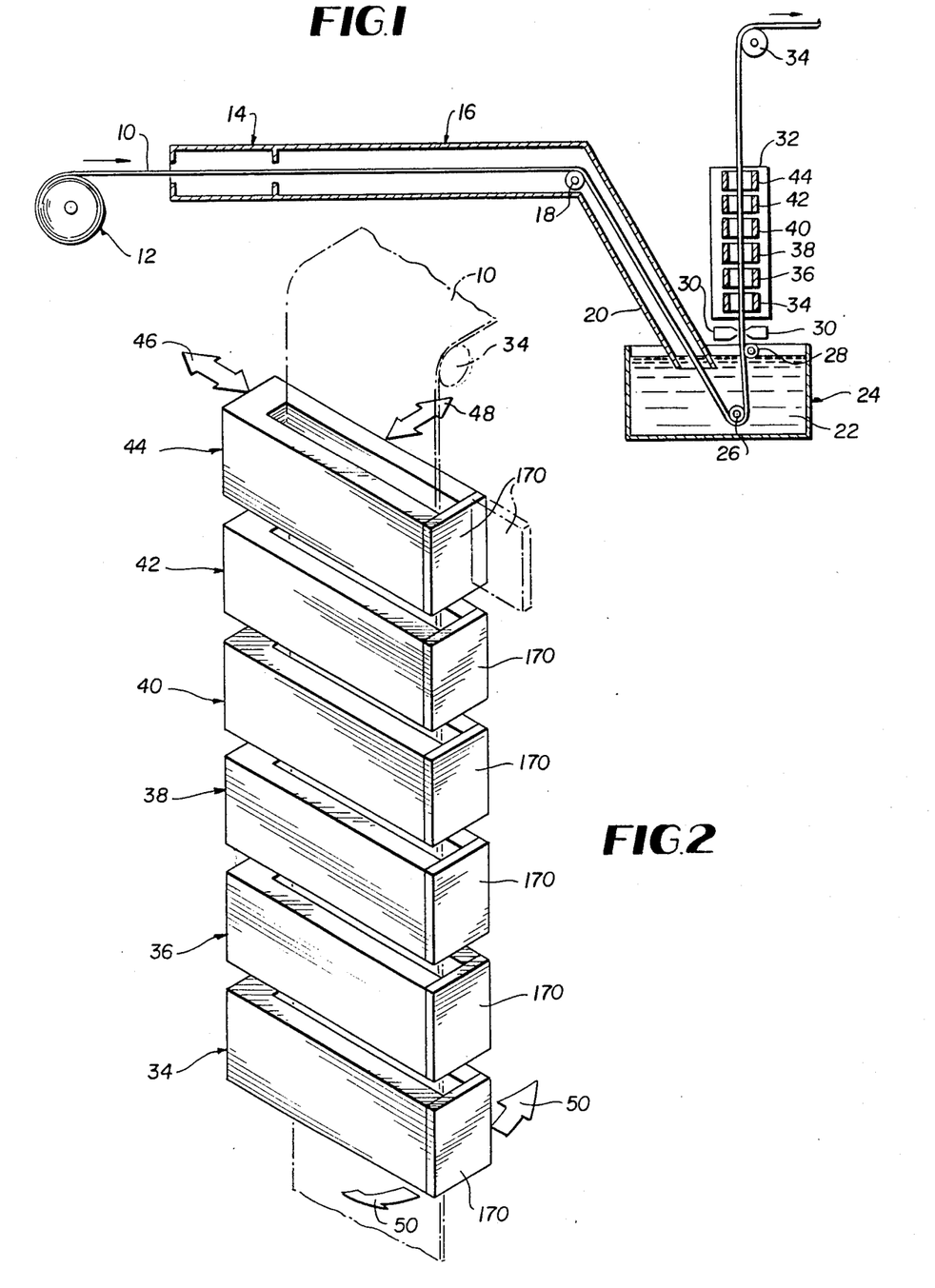
FIG. 1 is a schematic illustration of a continuous galvanneal line embodying the furnace of the present invention.
FIG. 2 is an isometric view schematically illustrating the path of a galvanized steel strip through a bank of induction coils in the galvanneal furnace according to the present invention.

In FIG. 1, steel strip 10 is provided in continuous form from a suitable supply illustrated schematically by coil 12. The continuous strip passes through a suitable cleaning operation, not shown, and into a heating furnace 14 which, in practice, may be a multiple pass continuous annealing furnace or merely a heating chamber which brings the strip up to the desired temperature for galvanizing. From furnace 14, the strip is led through a non-oxidizing atmosphere in chamber 16, over a guide roll 18, and downwardly through snout 20 having its bottom open end disposed below the surface of a bath 22 of molten zinc contained in the spelter pot 24. Strip 10 passes around a sink roll 26 in the spelter pot, then upwardly and out of the bath in contact with an adjustable, partially submerged anti-flutter roll 28 and past a pair of adjustable air knives 30 which direct controlled streams of pressure gas onto the surface of the emerging coated strip to control the thickness and distribution of the layer of molten zinc adhering to the surface of strip 10. The process thus far described is a conventional hot dip galvanizing operation and further description thereof is not believed necessary for an understanding of the present invention, it being understood, of course, that other conventional galvanizing apparatus and practice may be employed in conjunction with the present invention.

From the coating control air knives 30, the zinc coated strip passes in a substantially straight path through a heat treating or galvanneal furnace 32 and upwardly around a guide roll 34, then proceeds to suitable coiling or other operations. Furnace 32 comprises a plurality of induction coils 34, 36, 38, 40, 42 and 44, each providing, in operation, a closed electrically conductive circuit completely surrounding the coated strip in its path through the furnace whereby the strip passes through the open center of each induction coil as best seen in the schematic illustration of FIG. 2. Also, as illustrated in FIG. 2 and described more fully hereinbelow, the furnace 32 is supported for generally horizontal straight line movement in a direction parallel to the side surfaces of the strip 10 as illustrated by the arrow 46. Further, the induction coil assembly is supported in the furnace, for limited independent movement in a generally horizontal direction perpendicular to arrow 46 as indicated by the arrow 48 and for limited pivotal movement of the bottom end, i.e., the end at coil 34, in the direction of arrows 50 whereby vertical alignment of the coils may be adjusted to maintain the strip substantially centered through each coil despite deviations of the strip from the vertical in its movement through the furnace.

Figure 3:
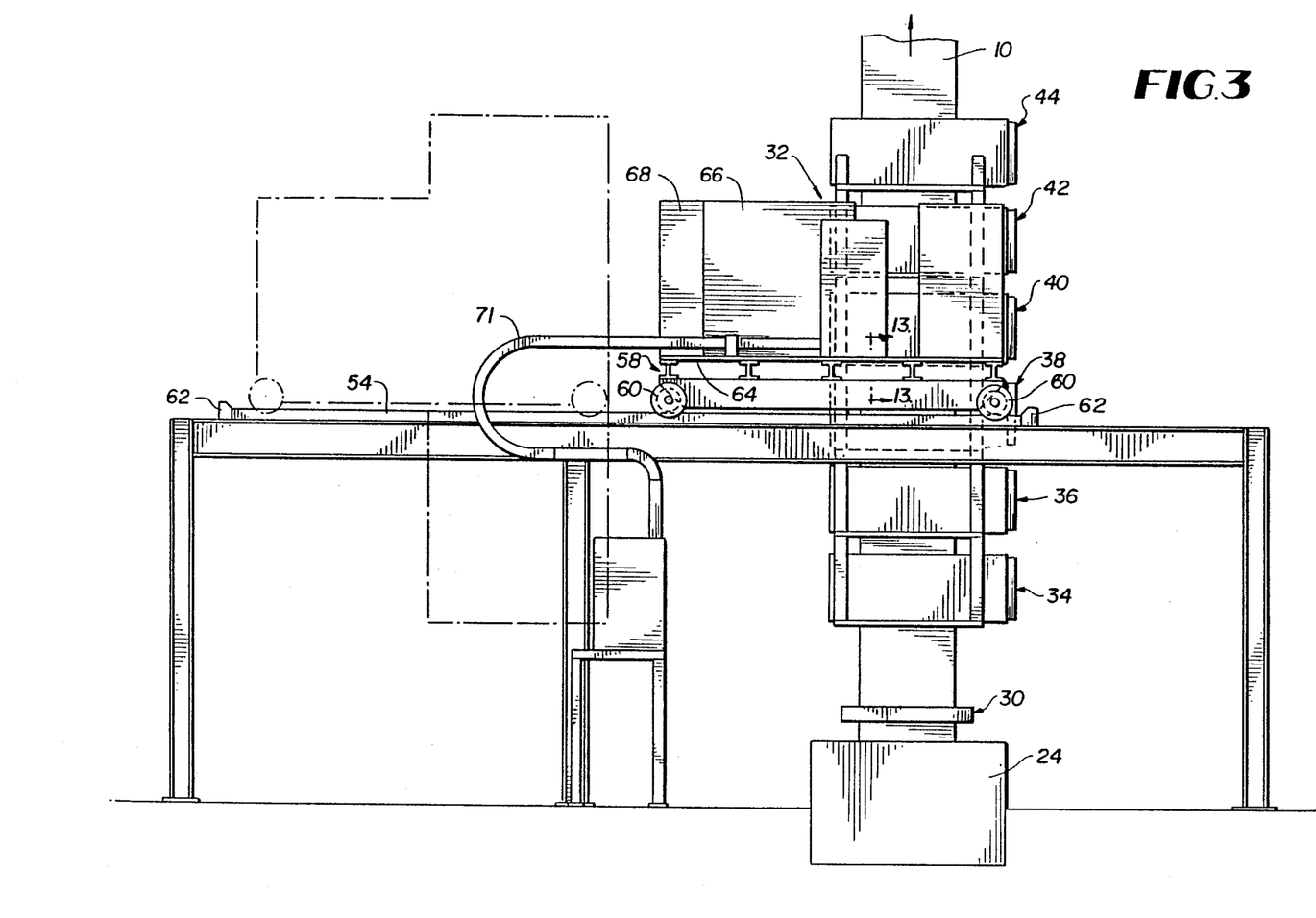
FIG. 3 is a side elevation view of a galvanneal furnace according to the present invention.
Figure 4:
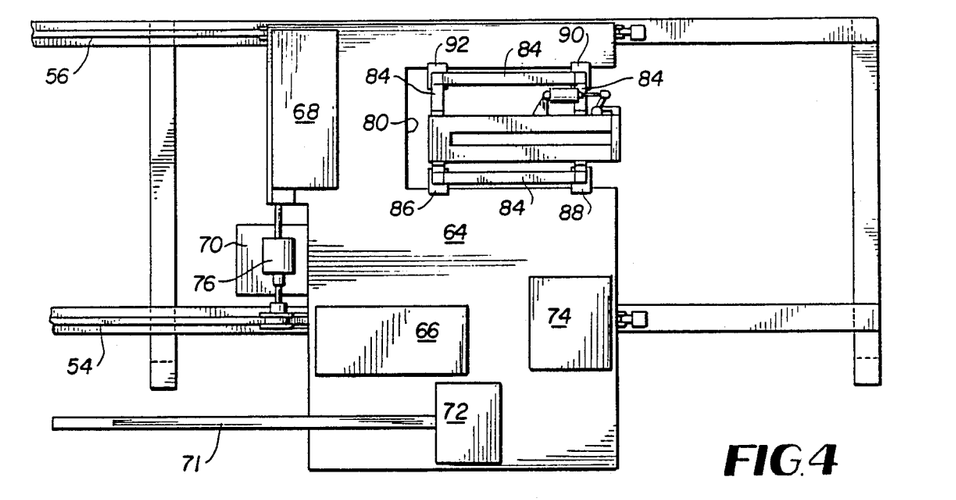
FIG. 4 is a top plan view of the structure shown in FIG. 3.
Figure 5:
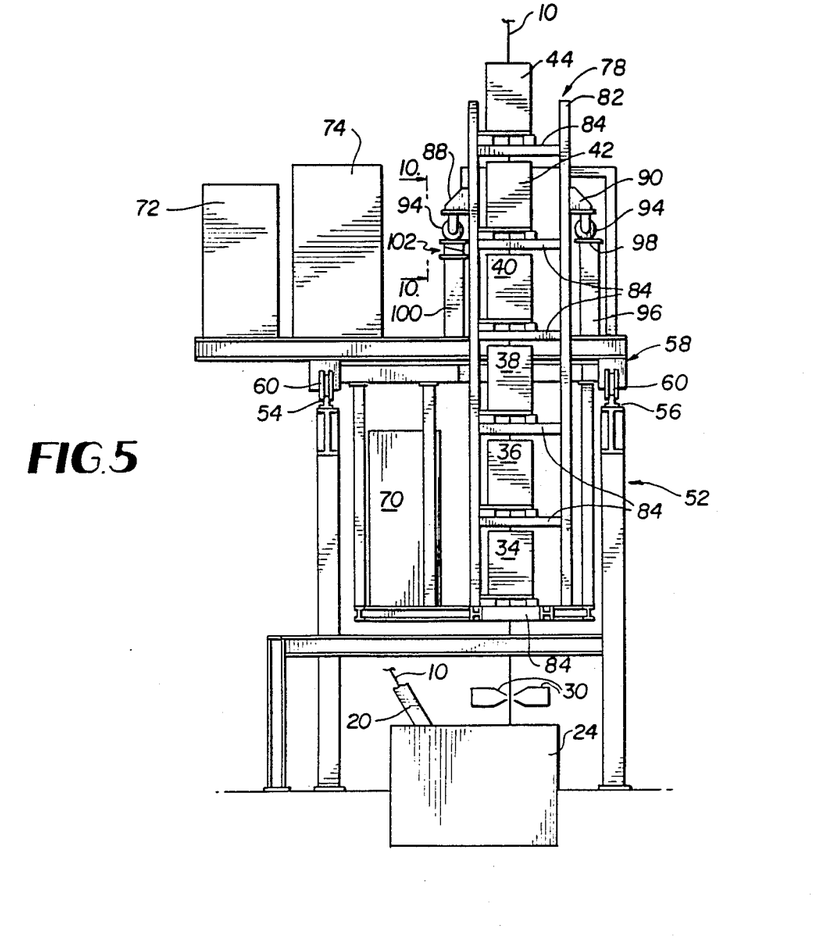
FIG. 5 is an end view of the structure shown in FIG. 3.

Referring now to FIGS. 3-5, it is seen that the furnace 32 is supported on a rigid stationary frame assembly 52 having a pair of laterally spaced, horizontal tracks 54, 56 extending above and laterally from the spelter pot 24. Furnace 32 includes a movable frame or carriage indicated generally at 58, supported by a plurality of wheels 60 engaging the tracks 54, 56. Stops 62 on the respective ends of tracks 54, 56, limit movement of the carriage 58 from a use position above the spelter pot 24 shown in full lines in FIG. 3 and a retracted or non-use position laterally spaced from the spelter pot 24 shown in broken lines in FIG. 3. Carriage 58 has a substantially horizontal, flat deck or platform surface 64. In the embodiment illustrated three power supply units 66, 68 and 70 are supported on carriage 58 for movement therewith, with each power supply providing current to two coils. A suitable flexible electrical supply cable and cooling water conduits are provided as illustrated at 71. A suitable pull box 72 for the electrical connections for the power supplies and the coils is also supported for movement with the platform as is a conventional heat station 74. The power supplies, pull box and heat station are commercially available and are conventional in construction and form no part of the present invention. It is pointed out, however, that mounting this equipment for movement with the furnace greatly simplifies construction and protection of the electrical connections between the respective power supplies and the heating coils associated therewith. Suitable drive, such as a reversible motor acting through a reduction gear, indicated schematically at 76 in FIG. 4 is provided to drive the furnace 32 along tracks 54, 56.

A coil support frame assembly 78 is mounted on movable carriage 58 and provides support for the individual induction coil assemblies 34-44. Frame assembly 78 comprises an open, elongated generally rectangular frame structure extending in a generally vertical direction through a rectangular cut out 80 in platform 64 as best seen in FIG. 4. Frame assembly 78 is made up of four substantially identical elongated column members 82 disposed one at each corner of the rectangular frame assembly and connected by transverse structural members 84 to define an open trusslike frame for supporting the coils 34-44 in vertically spaced relation and in alignment with one another whereby the coated strip 10 may pass in a generally vertical path upwardly through the open center of the respective coils in the manner illustrated in FIGS. 1 and 2.

Four wheel brackets 86, 88, 90 and 92 are rigidly mounted on frame assembly 78 at a location spaced downwardly from the upper end thereof and each bracket mounts a grooved wheel 94 for rotation about horizontal axes parallel to tracks 54, 56. Wheels 94 supported on brackets 86, 88 are mounted for rotation about a common horizontal axis spaced outwardly from the columns 82 on one side of the strip while the wheels 94 on brackets 90, 92 are mounted for rotation about a second common horizontal axis spaced outwardly from the columns 82 on the other side of the frame 78.

A pair of rigid support posts 96, only one of which is seen in FIG. 5, are mounted on and extend upwardly from platform 64 and terminate at their top end in a horizontal bearing plate 98 disposed one beneath the wheels 94 on brackets 90 and 92. A similar, but slightly shorter pair of posts 100 mounted on platform 64 extend upwardly and support the wheels 94 on brackets 86, 88. Posts 100 each terminate at their top end in a height adjustment mechanism 102 illustrated in FIGS. 10-12.

Figure 10:
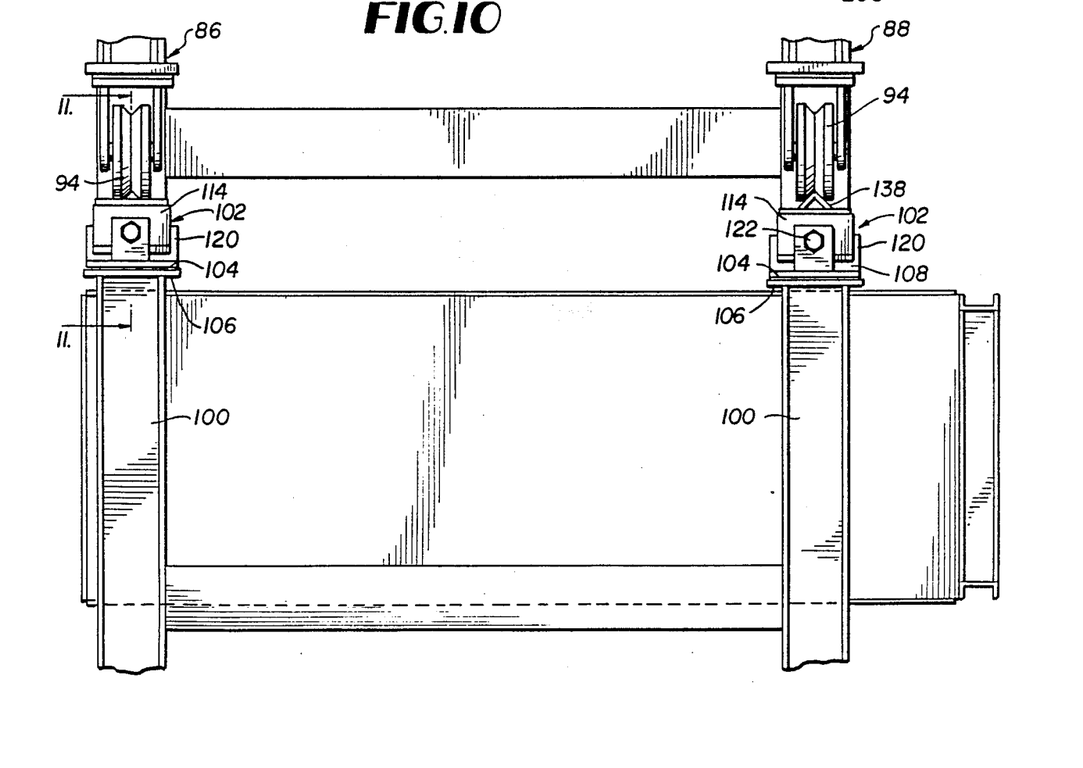
FIG. 10 is an enlarged, fragmentary view taken along line 10—10 of FIG. 5.
Figures 11, 12, 13:
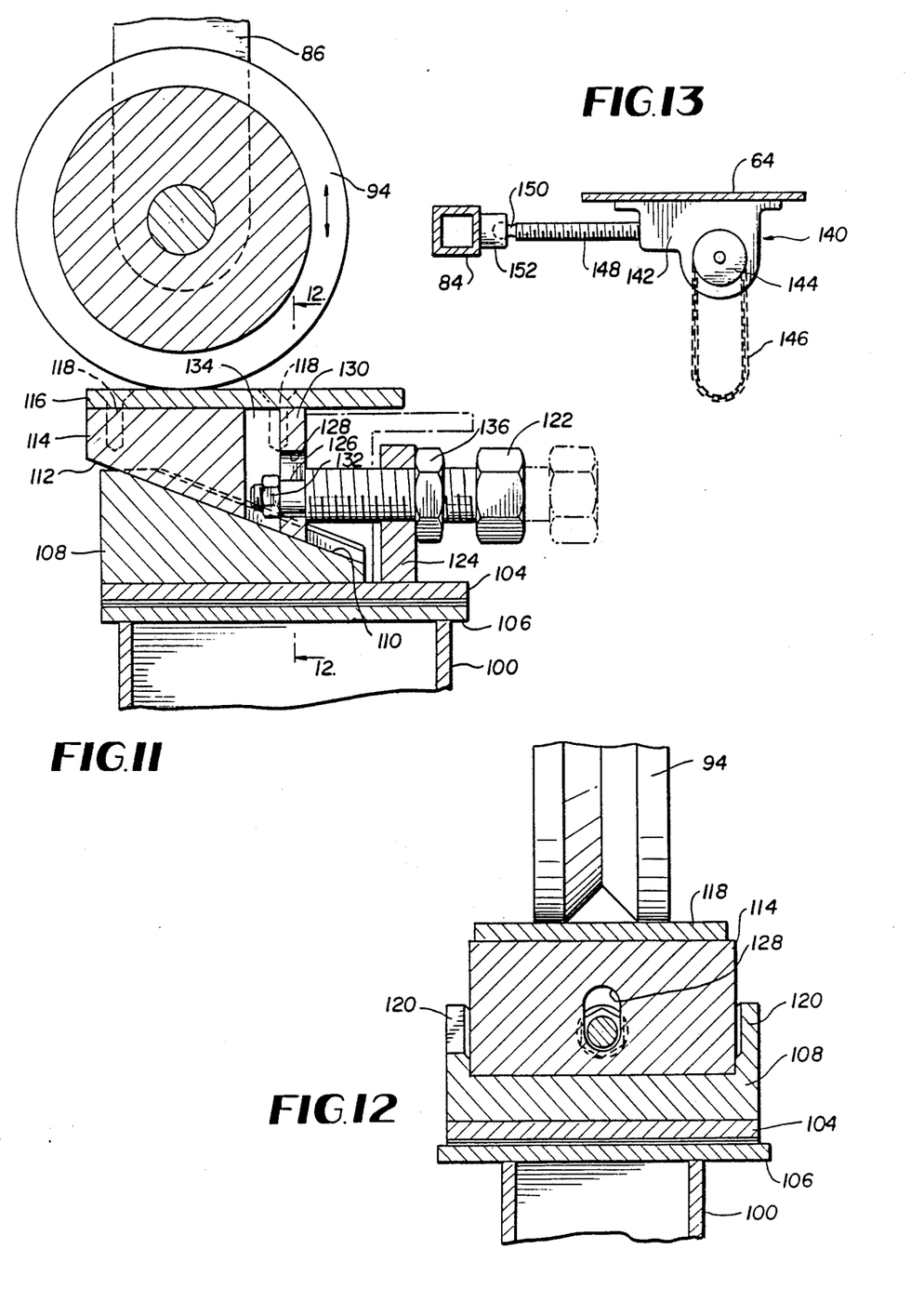
FIG. 11 is an enlarged sectional view taken along line 11—11 of FIG. 10.
FIG. 12 is a sectional view taken along line 12—12 of FIG. 11.
FIG. 13 is a sectional view taken along line 13—13 of FIG. 3.

Each height adjusting mechanism 102 comprises a base plate 104 rigidly joined, as by welding, to a bearing plate 106 on the top of post 100 and a wedge-bearing shaped bearing block 108 rigidly joined as by welding to the top surface of mounting plate 104. Block 108 has an upwardly inclined bearing surface 110 which engages and supports a downwardly directed inclined surface 112 on a second bearing block 114. A bearing plate 116 is mounted, as by screws 118, on the top of block 114 to support the grooved wheels 94. Flanges 120 on block 108 constrain block 114 to move in a straight line along inclined surface 110.

A jack screw 122 is threadably received in an opening in an upwardly extending plate 124 rigidly mounted on plate 104, and a reduced diameter collar portion 126 on jack screw 122 extends through an elongated slot 128 in a vertical flange 130 of top bearing block 114. A retaining nut 132 is mounted on the end of the jack screw within a slot 134 of block 114 whereby rotation of the jack screw 122 in the threaded opening of plate 124 produces sliding movement of the inclined surfaces 110, 112, relative to one another to raise or lower bearing plate 116. A lock nut 136 is provided to retain the assembly in a desired adjusted position.

Frame assembly 78 is thus supported for rolling movement by wheels 94 on bearing plates 98 on top of columns 96 and on the height adjusting devices 102 on top of posts 100. In order to maintain the frame assembly 78 in accurate alignment, a pair of angle members 138 are rigidly mounted, as by welding, on the top surface of one bearing plate 118 and on one bearing plate 98, with the two angles 138 being in substantially axial alignment with one another. The angles 138 fit into the grooved wheels 94 to prevent lateral shifting of the frame assembly. It should be understood, of course, that angles 138 might also be used on the other two support posts though in practice this has not been found to be necessary.

In order to accurately position the frame assembly 78, and the coils supported thereon, relative to the pass line of a strip through the furnace, in the direction of arrow 48 (FIG. 2) a second jack screw adjusting device is provided as illustrated schematically in FIG. 13. This device employs a commercially available, manually actuated chain driven worm screw actuator indicated generally by the reference numeral 140. The actuator 140 is rigidly mounted on the bottom of platform 84 and includes a housing 142 and operating wheel 144 driven by the manually actuated chain 146. A jack screw 148 extends from housing 142 and terminates in a ball 150 which engages and is retained in a vertically elongated socket in block 152 carried by one of the structural beam members 84 of frame 72. Thus, it is seen that manual operation of the chain 146 will drive the jack screw which, acting through the ball and socket connection, will provide limited controlled movement of the coil support frame assembly 78 to accurately position the frame relative to the pass line of a strip 10 moving through the furnace. At the same time, manual adjustment of the jack screws 122 will provide limited tilting movement of the frame assembly in the direction of arrows 50 in FIG. 2 to enable accurate compensation for any misalignment of the strip with respect to the vertical as may be required by adjusting the anti-flutter roll 28 to provide smooth, straight line passage of the strip through the furnace.

Referring now particularly to FIGS. 6–9, the construction of the individual induction heating coils will be more fully described. Since coils 34–44 may be substantially identical in construction, only coil 44 will be described in detail, it being understood that the description applies equally to all coils used in a particular furnace construction. It should also be apparent that the number and size of the coils may vary depending on numerous factors including strip speed, product thickness, coating weight and the desired degree of alloying of the coating.

Coil assembly 44 includes an outer frame or housing having spaced sidewall assemblies 160, 162 joined at one end by a fixed end wall assembly 164. The sidewall and end wall assemblies are each made up of inner and outer, spaced panel members 166, 168, respectively. The end of the housing opposite wall 164 is closed during operation of the furnace by a movable connector door assembly 170 mounted, as by a rigid bracket 172, for pivotal movement about a shaft 174 supported by journal bearings 176 on wall 160. A double acting fluid cylinder 178 having its cylinder end pivotally connected on bracket 180 on sidewall 160 and its rod end pivotally connected to an actuating arm 182 is employed to move the door 170 between the closed and open positions shown in full line and in broken line, respectively, in FIG. 6.

Figure 9:
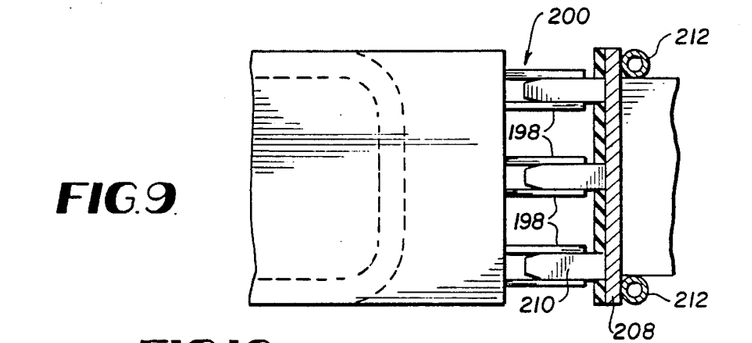
FIG. 9 is a sectional view, on an enlarged scale, taken along line 9—9 of FIG. 6.

An electrical inductance coil assembly 184 is supported within the housing and provides a plurality of loops of electrical conductor material extending completely around the path of the strip through the open center 186 of each coil when door 170 is closed. As shown in FIG. 9, conductor material in the coils may comprise a generally flat copper bar 188 having a layer of insulating material 190 bonded to its inwardly directed surface and a heat exchanger tube 192 joined, as by brazing, directed to its outer surface. A plurality of electrically insulating connectors 194 extend between the individual conductor bars 188 and the internal wall 160 of the furnace housing to support the induction coil within the housing.

The conductor bars 188 extend in vertically aligned parallel relation to one another and in inwardly spaced relation to the sidewalls 160, 162 and terminate at the end adjacent the movable door 170 in a free end. Each free end has mounted thereon the resilient contact elements 198 of a triple contact knife connector assembly indicated generally at 200 in FIG. 9. To provide strength and dimensional stability to the switch contact element 198, an angle member 202 is connected to each and is joined, through insulators 204 to a rigid bracket 206 in the housing.

Figure 6:
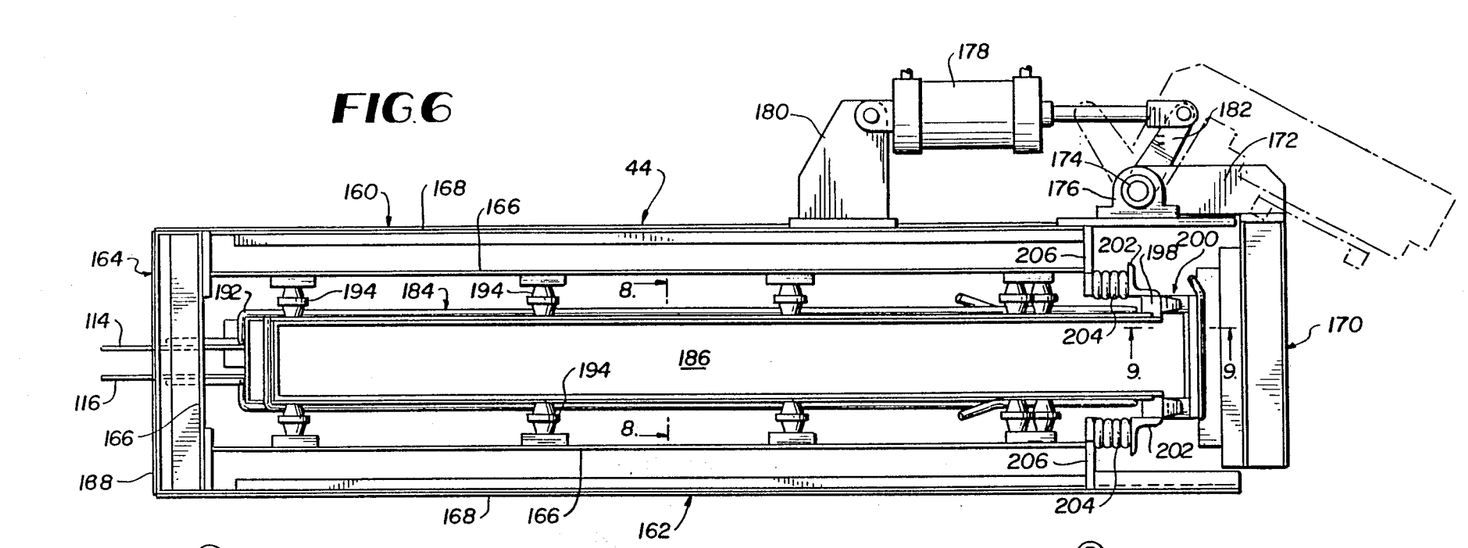
FIG. 6 is a plan view, on an enlarged scale, of one of the induction coil units employed in the furnace of the present invention.
Figure 7:
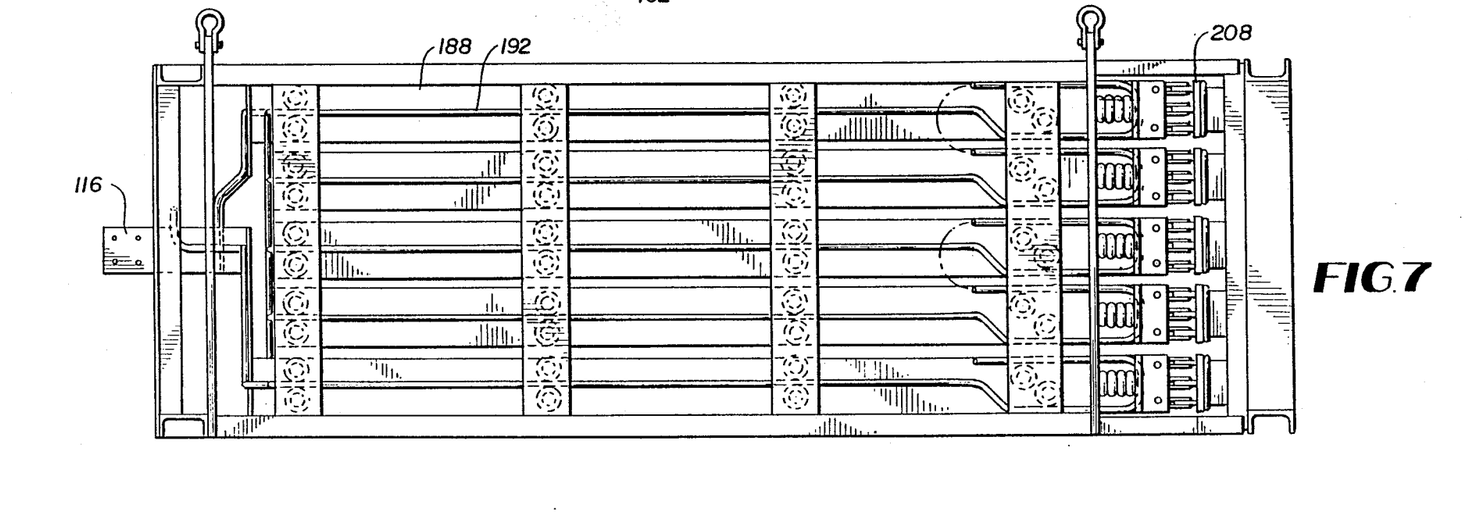
FIG. 7 is a side elevation view of the induction coil unit shown in FIG. 6.
Figure 8:
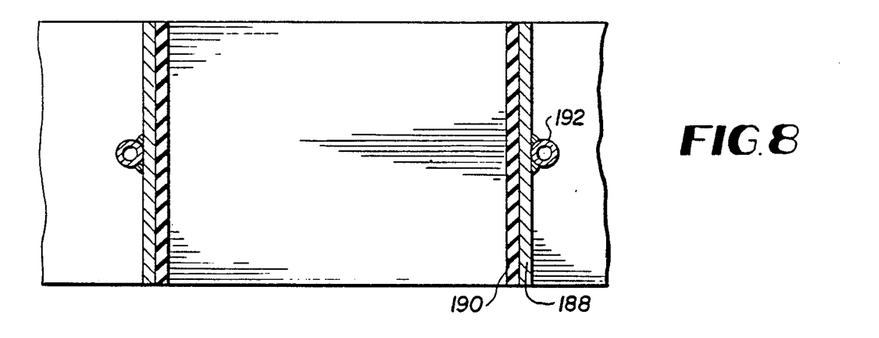
FIG. 8 is a sectional view, on an enlarged scale, taken along line 8—8 of FIG. 6.

A plurality of electrical conductor bars 208 are mounted on the inwardly directed surface of movable door 170, and knife elements 210 of the triple knife connector 200 are mounted on the opposed ends of the conductor bars 208 in position to fit between and make electrical contact with the resilient contact elements 198 when the door 170 is in the closed position shown in full lines in FIGS. 6 and 7. In practice, the triple contact connector is designed so that contact by one knife member 210 with a cooperating pair of resilient contact elements 198 will carry the necessary current for operation of the furnace, with the remaining two being provided for maximum assurance of proper contact. A heat exchanger tube 212 extends in a double pass along the back of each conductor bar 208 in the door assembly. Cooling water is provided through suitable connections, not shown, to tube 212 during operation to prevent overheating of the conductor bar. Similarly, cooling water is provided through the heat exchanger tube 192 to extract heat from the conductor bars 188. Tubes 192 on each conductor bar are connected by suitable conduits, not shown, to provide a continuous path for the cooling water along each conduit bar 188.

Electrical current is provided to the coil assembly from a suitable bus bar through connector plates 114, 116, and the conductor bars 188 on opposing sides of the elongated rectangular opening 186 are connected at the closed end of the coil, i.e., the end adjacent end wall 164, to provide a continuous current path from connector plate 114 to plate 116 through the respective conductor bars 188 in housing 160 and bars 208 on movable door 170 when the door is in the closed position.

When it is desired to remove the galvanneal furnace from the galvanizing line, it is only necessary to deenergize the coils and open all of the connector doors 170 by applying fluid pressure to the rod end of cylinder 198. Once the doors are open, drive motor 76 may be energized in the direction to drive wheels 60 along tracks 54, 56 to move the furnace to the non-use position shown in broken lines in FIG. 3. Conversely, to position the furnace online, it is only necessary to reverse the drive motor 76 to locate the furnace in the operable position with the strip passing upward through open centers 186 of the respective coils. The connector door assemblies may then be closed by applying fluid pressure to the cylinder end of cylinder 178.

Once the furnace is in position above the spelter pot 24, the coil support frame may be accurately positioned relative to the strip by use of the jack screws 122 to initially position the vertical center plane of the coil assemblies parallel to the side surfaces of the strip passing therethrough by pivoting the frame 78 about the axis of the wheels 94 on brackets 90, 92. The worm screw actuator 140 is then used to accurately center the strip within the openings 186. This accurate alignment and positioning of the furnace greatly enhances the efficiency of the furnace by enabling the coil assemblies to be constructed so that the conductors pass in closely spaced relation to the strip. Further, accurate positioning of the strip relative to the coils produces a substantially more uniform, high quality product not achievable with prior art furnaces known to applicant.

While a preferred embodiment of the invention has been disclosed and described in detail, it should be apparent that the invention is not so limited but rather that various modifications may be made to the structure, and it is intended to cover all embodiments of the invention which would be apparent to one skilled in the art and which come within the spirit and scope of the invention.

What is claimed:

1. In an electric induction furnace for use in a continuous galvanneal operation wherein a zinc coating applied to the surface of a running length of steel is converted to a zinc iron alloy coating by passing the running length of zinc coated steel along a generally straight path through the furnace and heating the coated strip during movement through the furnace to alloy the zinc coating with iron from the steel strip, said furnace having at least one induction coil including electric conductor means defining a closed loop having an opening through which the running length of coated steel passes in movement through the furnace, and power means supplying electric current to the conductor means for inductively heating the coated strip passing through the closed loop, the improvement comprising, a frame supporting said at least one induction coil,
carriage means supporting said frame and said coil for movement between a first position wherein the opening in said coil extends around said generally straight path and a second position wherein the coil is spaced from said generally straight path,
connector means defining a part of said conductor means,
support means mounting said connector means for movement between a closed position forming a part of said loop and an open position forming an opening in the said loop, and
power means operatively associated with said support means for moving said connector means between said open and said closed positions whereby said closed loop may be opened to permit said furnace to be moved between said first and said second positions while said running length of zinc coated steel extends along said straight path.

2. The invention defined in claim 1 wherein said furnace comprises a plurality of said induction coils, and a housing surrounding each said coil, each said housing having an opening extending therethrough to permit the running length of zinc coated steel to pass through the housing and the coil enclosed therein.

3. The invention defined in claim 2 wherein each said housing comprises a door supported for movement between an open position and a closed position, and wherein said connector means comprises conductor means mounted on each said door and forming a part of said closed loop when said door is in said closed position.

4. The invention defined in claim 3 wherein each said induction coil comprises a plurality of closed loops each defined by a conductor section mounted in fixed position within one of said housings and a movable conductor section mounted in fixed position on the movable door of that housing, and multiple contact knife blade contact means providing electrical connection between said movable conductor means and said fixed conductor means of each loop when said door is in the closed position.

5. The invention defined in claim 4 wherein each contact of each said multiple contact knife connectors is designed to carry the full electric current load in a loop during operation of the furnace.

6. The invention defined in claim 3 further comprising mounting means supporting said frame on said carriage means for limited movement relative thereto, whereby the position of said plurality of coils may be adjusted relative to a running length of zinc coated steel passing through the furnace.

7. The invention defined in claim 6 wherein said mounting means comprises means moving said frame in a substantially straight path transversely of the path of a running length of coated steel.

8. The invention defined in claim 6 wherein said mounting means comprises means for pivoting said frame about an axis extending generally perpendicular to the direction of movement of a running length of coated steel passing through the furnace.

9. The invention defined in claim 6 wherein said mounting means comprises means moving said frame in a substantially straight path transversely of the path of a running length of coated steel and means for pivoting said frame about an axis extending generally perpendicular to the direction of movement of a running length of coated steel passing through the furnace.

10. The invention defined in claim 9 wherein said means for pivoting said frame comprises manually operable jack screw means engaging one side of said frame, said jack screw means being operable to raise and lower said one side.

11. The invention defined in claim 1 wherein said electric conductor means of each said at least one induction coil means comprises a plurality of closed loops, and wherein said connector means comprises a plurality of elongated movable connector bars one electrically connected with and forming a part of each said closed loop when said connector means is in said closed position.

12. The invention defined in claim 11 wherein said electric conductor means comprises a plurality of elongated, generally U-shaped conductor bars mounted in fixed spaced relation to one another and each forming a major portion of one of said closed loops.

13. The invention defined in claim 12 wherein said connector means comprises a plurality of multiple contact knife blade connectors one connecting one end of each said elongated connector bars to one end of said conductor bars when said connector means is in said closed position.

14. The invention defined in claim 13 wherein said connector means comprises a door pivotally mounted for movement between a closed position and an open position.

* * * * *